US005161761A

United States Patent [19]

May

[11] Patent Number: 5,161,761

[45] Date of Patent: Nov. 10, 1992

[54] TELESCOPING DEVICE MOUNTING STAND WITH MECHANICAL MEMORY AND INTERNAL WIRING

[76] Inventor: Gordon H. May, 3261 Woodleigh La., Cameron Park, Calif. 95682

[21] Appl. No.: 736,705

[22] Filed: Jul. 26, 1991

[51] Int. Cl.[5] ................ F16L 3/00

[52] U.S. Cl. ................ 248/122; 84/421; 84/DIG. 3; 84/DIG. 12

[58] Field of Search ................ 248/124, 181, 177, 166, 248/460, 122, 121; 84/421, DIG. 3, DIG. 12, 1.01

[56] References Cited

U.S. PATENT DOCUMENTS

| | | | |
|---|---|---|---|
| 1,661,805 | 3/1928 | Lentaty | 248/166 |
| 4,187,947 | 2/1980 | Dunn | 84/327 X |
| 4,441,398 | 4/1984 | Baker | 84/421 |
| 4,479,414 | 10/1984 | Willis | 84/421 |
| 4,488,468 | 12/1984 | Peterson | 84/1.01 |
| 4,550,638 | 11/1985 | Kaneko | 84/DIG. 3 X |
| 5,063,821 | 11/1991 | Battle | 84/421 X |

*Primary Examiner*—J. Franklin Foss
*Attorney, Agent, or Firm*—Peter Peckarsky

[57] ABSTRACT

A telescoping stand combining mechanical memory with integrated internal electrical wiring with plug-in connectors. The stand is equally suitable for mounting various electro-mechanical devices including, but not limited to, musical drums (electric or acoustic), lighting fixtures, displays, consoles, keyboards, and other items or devices where repetitious precise mechanical positioning with integral internal electrical connections is required. Once initially set up, the stand can be locked for height and rotation (vertical and horizontal, or radial, angular, and polar) and is then ready for disassembly and subsequent re-assembly and connection to external electrical circuits after which re-assembly the precise mechanical positioning of the mounted devices will be restored.

5 Claims, 4 Drawing Sheets

TELESCOPING DEVICE MOUNTING STAND WITH MECHANICAL MEMORY AND INTERNAL WIRING

FIELD OF THE INVENTION

This invention relates to applications in which electro-mechanical hardware with integral internal electrical conductors must be precisely assembled and arrayed with a fixed relative spatial relationship, frequently disassembled and moved from place to place, and then must again be precisely assembled and arrayed with a fixed relative spatial relationship.

BACKGROUND OF THE INVENTION

Presently, telescoping stands and other items are used in certain applications to assemble and array precisely electro-mechanical hardware or equipment with a fixed relative spatial relationship to each other piece of equipment and to the base into which the stands are inserted. However, with one exception with respect to an essentially straight supporting stand which is discussed below, the present telescoping stands and other items (for example, joints above the level of the stand assembly which is inserted into a supporting base) do not have integrated electrical wiring internal to the stands or other items which support the devices. Thus, the present stands do not have mechanical memory with integrated internal electrical wiring for precisely replicating the location of the devices without having to re-establish the electrical connections between the devices and the base on which the supporting stands are located.

For example, U.S. Pat. No. 4,691,611 ("Electronic Percussion Instrument"), issued on Sep. 8, 1987, with the same inventor as this application. U.S. Pat. No. 4,691,611 claimed and disclosed only a socket means for maintaining only a constant angle between one end of a stand and the socket in a base into which the stand is inserted and between the other end of the stand and the socket on the piece of equipment which the stand supports. However, the invention of U.S. Pat. No. 4,691,611 did not prevent angular rotation of the stand about the long axis of the stand and further did not prevent motion of the stand parallel to the long axis of the stand (that is, pulling the stand out of either the base or the equipment or both). Using the invention of U.S. Pat. No. 4,691,611 it would have been necessary to make appropriate markings (as for example with a pencil or pen) on the sides of the stand sections in order to be able to restore the precise relative spatial relationship of the supported devices once the stands and supported equipment were disassembled. U.S. Pat. No. 4,691,611 disclosed a means for having integrated internal electrical wiring only in a supporting stand used in conjunction with a base socket which controlled only one of the three possible degrees of motion and even this disclosure did not make possible mechanical memory after the stand was collapsed unless pencil markings were made on the stand.

U.S. Pat. No. 4,691,611 was directed to applications in the musical world.

By the very nature of the business, musical bands must move frequently from location to location. One of the most difficult types of instruments to transport are percussion instruments because the instruments are both fragile and bulky. Stands of various types and sizes must be provided for each of the percussion heads as well as a seat for the musician. This variety of equipment makes the transport of the instrument very difficult.

Not only is it difficult to transport the instruments, but the set-up is also a major task. Unlike all string and wind instruments, the percussion instruments, due to the many individual components or percussions heads, presently require that each percussion head be arranged for height and attitude each time the musician performs. Additionally, when electronics are employed (for example, electric drums rather than acoustic drums), as for example as disclosed in U.S. Pat. No. 3,659,032 ("Percussion Instrument"), issued on Apr. 25, 1972, with the same inventor as this application, an electrical connection must be made between each percussion head and an amplifier which feeds an amplified signal to sound speakers for radiating the percussion sound. Naturally, the external electrical connections must be disconnected and reconnected with each move.

Prior to the invention disclosed in U.S. Pat. No. 4,691,611 ("Electronic Percussion Instrument"), the electrical connection from an electrical percussion head to an amplifier was made by means of a conductor external to the stand supporting the percussion head. This meant that there were, prior to the invention disclosed in U.S. Pat. No. 4,691,611, a plurality of electrical conductors extending from the percussion heads (of electric drums) to a control console, amplifier, or other electrical control devices.

In the example of percussion instruments, the supporting stands all must be grouped around the player's seat and must be positioned so as to tilt the percussion head at a precise angle so the player can strike each percussion head with ease. Percussion instruments are frequently played by merely striking a stick in an area known to be occupied by a percussion head without actually viewing the percussion head. For this reason, positioning and height are critical and must be replicated precisely with each set-up so that the playing of the instruments remains exactly the same.

SUMMARY OF THE INVENTION

One aim of this invention is to provide a suitable system-with full three dimensional mechanical memory and integrated internal electrical wiring for mounting electro-mechanical devices on supporting stand assemblies which assemblies are inserted into base sockets and for precisely restoring the relative spatial relationship of the mounted devices after separation and packing of the devices, stand assemblies, and the base. The base and all devices and assemblies may be packed and moved as required while retaining the ability to restore through the use of the mechanical memory disclosed the precise relative spatial arrangement of the devices without having to reinstall electrical connectors between the base and the mounted devices.

As will be understood from the description below, the fact that a newly invented collar is placed inside the lower section of the stand assembly makes possible the integration of internal electrical connectors and conductors with a telescoping stand with full mechanical memory.

For example, but not by way of limitation, in the use of the invention by a performing musician, once the musician has arrayed his instruments and devices for a given performance (e.g., percussion heads, keyboard, console, light, seat, and microphone) to suit his reach and playing techniques, the musician need not be present for subsequent set-ups of this equipment for future performances since a technician using the invention can re-assemble the devices in precisely the same relative position and need not re-install electrical connections from the base to each mounted electro-mechanical device.

Another aim of the present invention is to provide a means by which the angular rotation of a stand assembly with respect to a base socket may be precisely set and restored through the use of mechanical connectors with integrated internal electrical conductors.

Another aim of the present invention is to provide a means by which a stand assembly may be securely fixed in place in a base socket in such a manner that motion of the stand assembly along the long axis of the stand assembly is prevented and in such a manner that the stand assembly may, after removal from the base socket, be restored to precisely the same location in the base socket without the need to re-install electrical connections from the base to each mounted electro-mechanical device.

Another aim of the present invention is to provide a means by which the angular rotation of a stand assembly with respect to a device socket may be precisely set and restored without the need to re-install electrical connections from the base to each mounted electro-mechanical device.

Another aim of the present invention is to provide a means by which a stand assembly may be securely fixed in place in a device socket in such a manner that motion of the stand assembly along the long axis of the stand assembly is prevented and in such a manner that the stand assembly may, after removal from the device socket, be restored to precisely the same location in the device socket without the need to re-install electrical connections from the base to each mounted electro-mechanical device.

Another aim of the present invention is to provide a rotation adapter which may be used to set precisely and to restore the position of a device with respect to the top of a stand assembly (the top of a stand assembly is the end of the stand assembly which is not inserted into a base socket) without the need to re-install electrical connections from the base to each mounted electro-mechanical device.

A further aim of the present invention is to provide a plug adapter which may be used to set precisely and to restore the position of a device with respect to the end of a rotation adapter which is not connected to the top of a stand assembly without the need to re-install electrical connections from the base to each mounted electro-mechanical device.

A further aim of the present invention is to provide a means for providing an electrically conductive path internal to the stand assembly, the plug adapter, and the rotation adapter which internal electrically conductive path eliminates the need for an external conductor to connect an electro-mechanical device (e.g., a percussion head of an electric drum) to an amplifier, keyboard, or other electrical control device.

These aims are satisfied by a telescoping stand assembly having at least one base socket (but generally a plurality of base sockets), a rotation adapter, a plug adapter, a base with at least one base socket, and a device socket (or device adapter) all of which have integrated internal electrical wiring as shown and described in the accompanying drawings and description of the preferred embodiment and the claims. Internal electrical conductors and/or electrical plugs are contained within the stand assembly, the rotation adapter, the device adapter (or device socket), the plug adapter, and the base socket.

These and further operational and constructional characteristics of the invention will be more evident from the detailed description given hereinafter with reference to the figures of the accompanying drawings which illustrate one preferred embodiment by way of non-limiting examples.

DESCRIPTION OF THE PREFERRED EMBODIMENT

Figure 1:
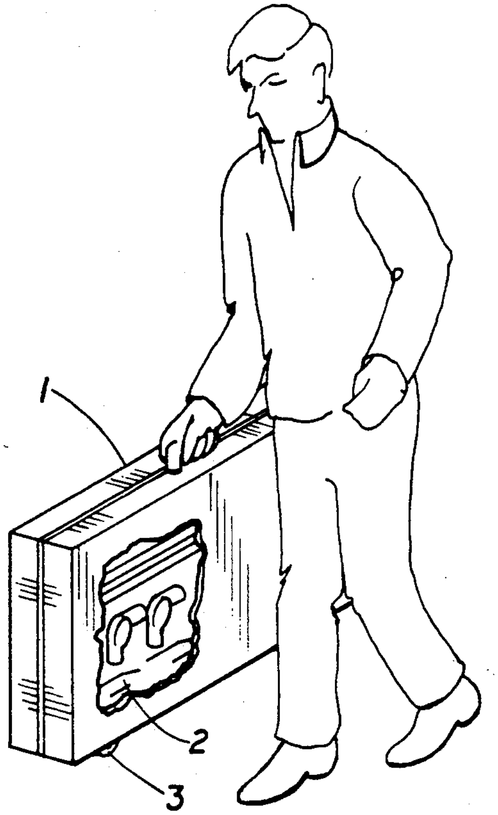
FIG. 1 shows a side view of a device carrying case in the closed position.
Figure 5:
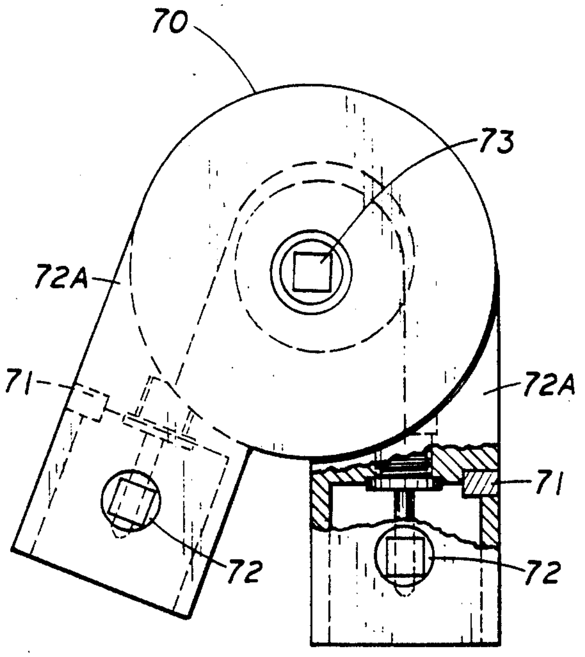
FIG. 5 shows a view and partial cut-away view of a rotation adapter.
Figure 6:
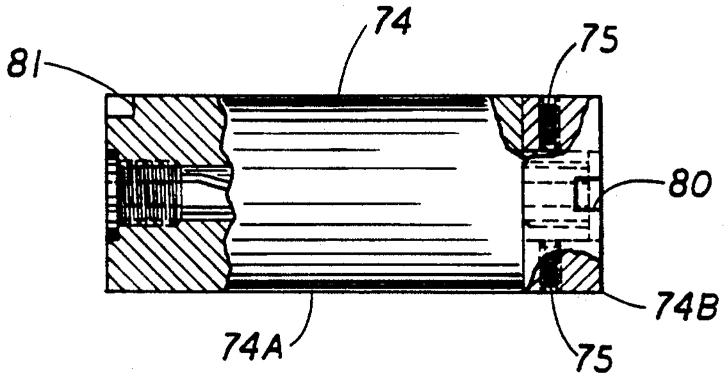
FIG. 6 shows a view and a partial cut-away view of a plug adapter.

FIG. 1 shows a device carrying case 1, with suitable openings or compartments 2 for storage of the stand assembly 25 (of FIG. 3 and FIG. 4), the rotation adapters 70 (of FIG. 5), and the plug adapters 74 (of FIG. 6). FIG. 1 also shows rollers 3 on which the carrying case 1 may be rolled when it is being moved.

Figure 2:
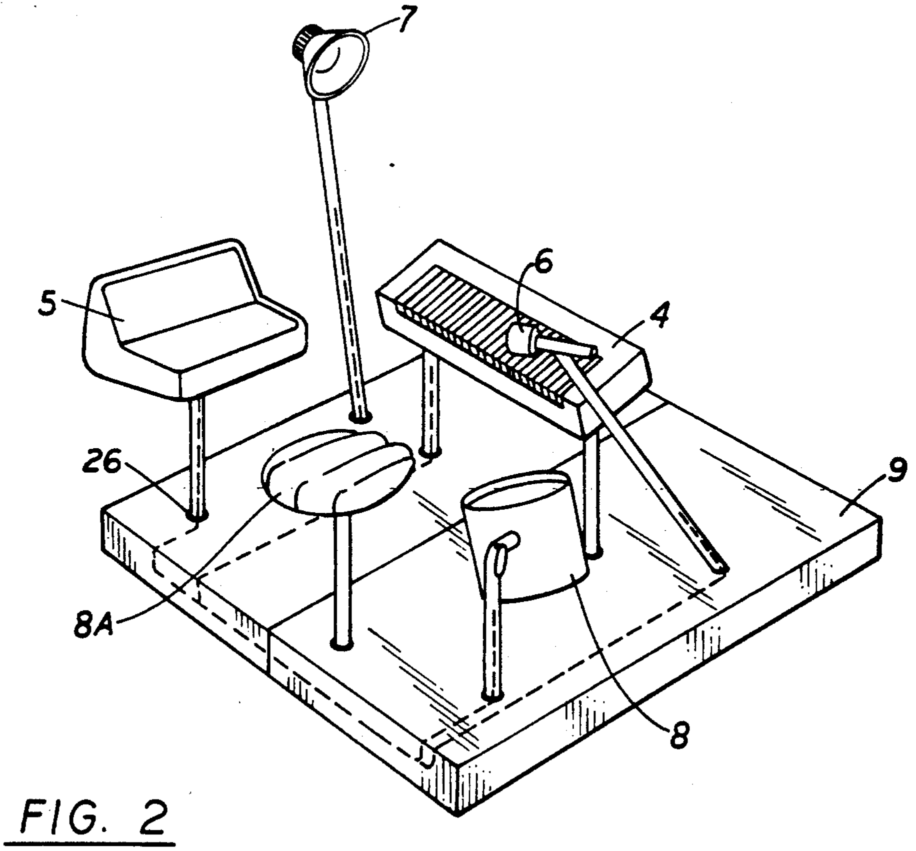
FIG. 2 shows a perspective view of a device carrying case in the open position.

FIG. 2 shows case 1 of FIG. 1 in the completely open position exposing the inner surface which forms base 9 with exemplary devices arranged for use. Such devices may include, but are not necessarily limited to, a keyboard 4, a display console or control console 5, a microphone 6, a light 7, a drum (or percussion head) 8, a chair or seat or stool 8A, and the like all of which are attached to base 9 by base mounting sockets 26 (hereinafter the base mounting sockets may be referred to as "base sockets").

Figure 3:
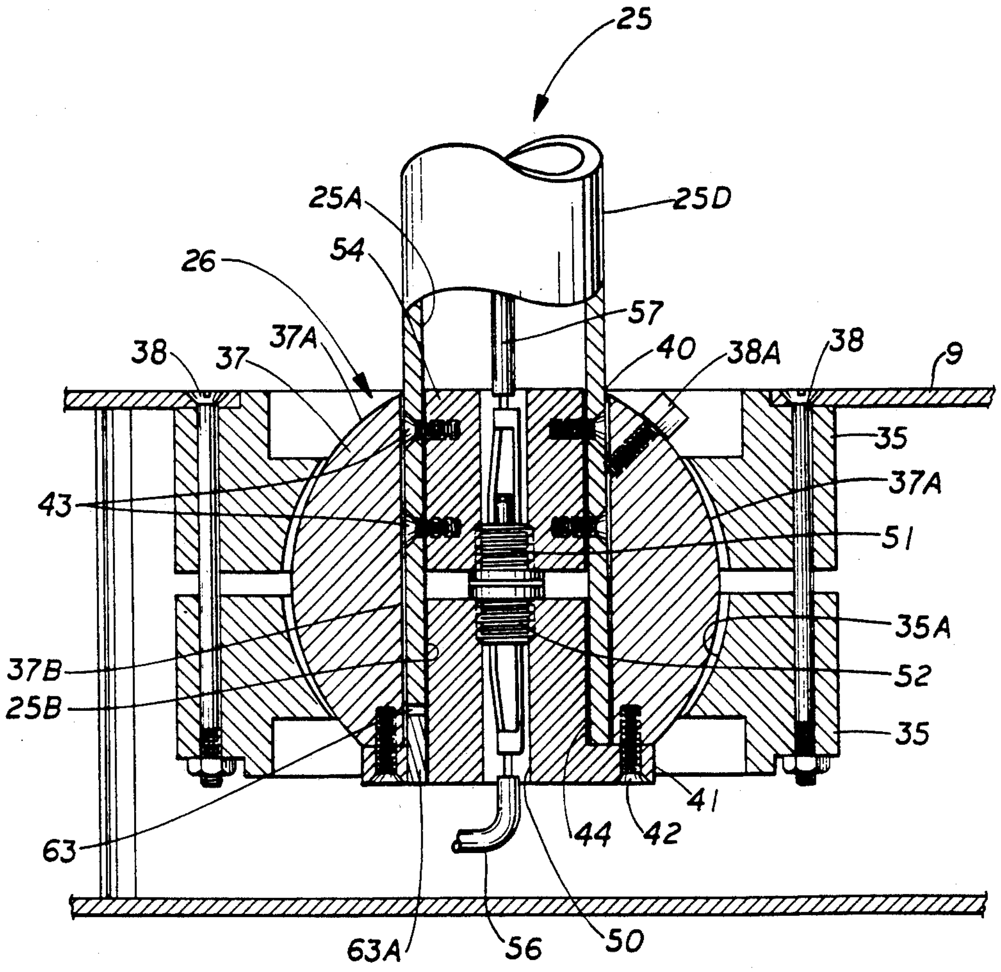
FIG. 3 shows a cross-sectional view of a base socket with the bottom portion of a stand assembly inserted into the base socket.

FIG. 3 shows a base mounting socket 26 which provides a means for precisely setting the angular tilt of a stand assembly 25 inserted into the base mounting socket 26 with respect to the base 9 should such angular tilt be required. Said socket 26 comprises a first semicircular retainer half 35 fixed to the bottom of the top wall of base 9. A second semicircular retainer half 35 identical to the first semicircular retainer half but inverted in orientation cooperates with the first retainer half to hold an inner spherical support 37 such that the inner support can be rotated for changing the attitude of the stand assembly 25 relative to the base surface 9.

By tightening the screws 38, positioned around the semicircular retainer halves 35, the retainers can be caused to squeeze together thereby bringing the inner surfaces 35A of the retainer halves into close engagement with the outer surfaces 37A of the inner spherical support 37 and thereby hold the inner spherical support 37 in place. In this manner, by adjusting the position (or attitude) of the socket (and thereby the position of the stand assembly 25 (inserted into center opening 40 of the inner spherical support 37) relative to the base and then tightening the screws 38 which locks the position of the base socket 26 relative to the base 9, the attitude of the stand assembly 25 relative to the base 9 is set and never changes unless the screws 38 are loosened. Thus, assuming the screws 38 have not been loosened between the time a stand assembly is removed from a base socket 26 and the time a stand assembly 25 is re-inserted into the same base socket again, the stand assembly 25 is automatically adjusted for attitude relative to the base 9 so as to position the upper end of the stand assembly 25 in the same position relative to the base 9 that the upper end of the stand assembly 25 was in before the stand assembly 25 was removed from the base socket 26.

Screw 38A locks the stand assembly 25 to the inner surface 37B of spherical support 37 to secure rigidly the stand assembly 25 to the spherical support 37.

When tightened into its proper position, screw 38A prevents any motion of stand assembly 25 parallel to the long axis of stand assembly 25. When tightened into its proper position, screw 38A also prevents any angular motion of stand assembly 25 around the long axis of stand assembly 25.

For mounting each stand assembly 25, the spherical support 37 includes a center opening 40 closed at its bottom end by an adapter 41 which is held in place by retaining screws 42 which screw into spherical support 37. The adapter 41 includes an outer surface 44 which contacts the inner wall 25A of the lower portion 25D of the stand assembly 25. The outer surface 25B of the lower portion 25D of the stand assembly 25 just fits within the central opening 40 of spherical support 37. The lower portion 25D fits around the upper portion of adapter 41 to hold the stand assembly 25 securely in place.

The adapter 41 includes a center opening 50 in which is mounted a male electrical jack 52 for insertion into a cooperating female electrical jack 51 which cooperating female jack 51 is held in a mount 54 which mount 54 is retained in position within the hollow stand assembly 25 by screws 43. Thus, as the stand assembly 25 is inserted into the spherical support 37, the female electrical jack 51 fits around the male electrical jack 52 to form an electrical connection between the conductor 56 extending upward from the base of adapter 41 and a conductor 57 leading downward from stand assembly 25.

Alternatively, adapter 41 could extend from the bottom of spherical support 37 which would allow the jack 54 to be flush with the bottom of lower section 25D of stand assembly 25 which would allow upper section 25C (FIG. 4) of stand assembly 25 to be collapsed farther into lower section 25D when stand assembly 25 is disassembled for storage or transportation. If upper section 25C were collapsed farther into lower section 25D then the total collapsed length of the stand assembly would be less than the minimum collapsed length with adapter 41 being flush with the bottom of spherical support 37. The shorter length may make it easier and more convenient and less expensive to store and transport the collapsed stand assemblies.

The adapter 41 also includes a screw or locating pin 63A which interfits with a groove or slot or notch 63 in the bottom of the wall of the lower portion 25D of stand assembly 25.

The screw or locating pin 63A and groove 63 serve as a memory lock and positioning device to fix the angle of rotation of the stand assembly 25 about the long axis of stand assembly 25. The screw or locating pin 63A may be perpendicular to or parallel to the long axis of stand assembly 25.

Figure 4:
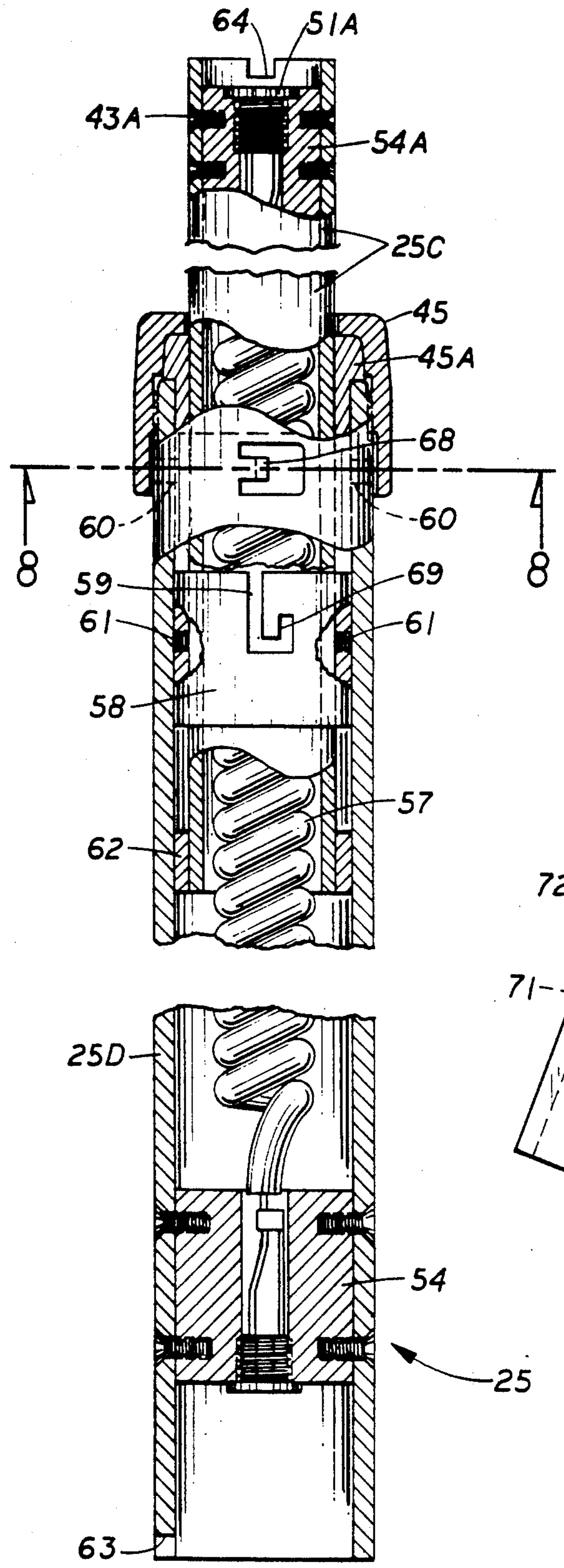
FIG. 4 shows a cross-sectional view of a stand assembly.

FIG. 4 shows the upper portion 25C of stand assembly 25. FIG. 4 shows that the top of the upper portion 25C of stand assembly 25 supports a mount 54A (similar to mount 54 of FIG. 3). A female electrical jack 51A is contained in mount 54A. The mount 54A is held in place by screws 43A.

FIG. 4 also shows the preferred embodiment for pre-setting mechanical memory in a telescoping device mounting stand. This unique feature teaches a new method and device for constructing and operating a telescoping device mounting stand in which electrical connections are made as a part of the mechanical memory set-up.

As will be understood from the description below, the fact that newly invented collar 58 is mounted on and outside upper section 25C and inside lower section 25D makes possible the integration of internal electrical connectors and conductors with a telescoping stand with full mechanical memory.

For adjusting the height of the device being mounted, the stand assembly 25 is comprised of upper section 25C and lower section 25D which telescope together. (As is mentioned below the invention encompasses devices with more than two sections comprising each stand assembly 25.) A nut 45 is threaded onto the top of the lower section 25D. A well-known sleeve 45A is inserted between upper section 25C and lower section 25D of stand assembly 25. The sleeve 45A in conjunction with nut 45 provides a friction means for securing upper section 25C to lower section 25D. Note, however, that a standard nut has been modified (i.e., a standard nut has been elongated to form nut 45 which covers tabs 68 and holes 60 to prevent exposure of the memory function means.

Initially, upper section 25C and lower section 25D are telescoped together to their minimum joint length with collar 58 being placed concentrically on and around the lower portion of upper section 25C immediately above spacer 62 which spacer 62 in conjunction with sleeve 45A maintains concentricity between sections 25C and 25D. Spacer 62 is also placed concentrically on and around upper section 25C.

In the following discussion of the rotation of upper section 25C with respect to lower section 25D, note that screws 61 which fix the position of collar 58 should not be finally tightened until the proper position of groove 64 is determined.

To preset the height and angular rotation (about the long axis of stand assembly 25) of stand assembly 25, one must extend upper section 25C with set screws 61 lightly secured so collar 58 can be rotated with upper section 25C. At a point near the fully extended point of upper section 25C (that is, upper section 25C has been almost entirely removed from lower section 25D), tabs 68 of lower section 25D will engage the bayonet slots 59 of collar 58. A rotation (about the long axis of stand assembly 25) of upper section 25C may be required to cause the engagement of the tabs 68 of lower section 25D with the bayonet slots 59 of collar 58. Upper section 25C is then further rotated (about the long axis of stand assembly 25) until the tabs 68 of lower section 25D are fully seated into the locking position 69 of the bayonet slots 59. When the tabs 68 of lower section 25D are fully seated into the locking position 69 of the bayonet slots 59, the set screws 61 of collar 58 will be visible through holes 60 of lower section 25D.

A suitable tool, such as an allen wrench, may be used to loosen the screws 61 to allow the upper section 25C of stand assembly 25 to be set at a precise height relative to lower section 25D of stand assembly 25.

The memory lock groove 64 in the upper edge of upper section 25C may be used to establish the relative angular position of upper section 25C with respect to lower section 25D. An angular rotation of upper section 25C (about the long axis of stand assembly 25) may be required to establish the proper horizontal location of the device attached to the top of upper section 25C with respect to secured lower section 25D which lower section 25D is located horizontally by groove 63 and locating pin 63A of FIG. 3. The device attached to the upper end of upper section 25C will, as described below, have a locating pin (for example, see pins 71 of FIG. 5 and pin 77 of FIG. 7) which will fit into memory lock groove 64 to establish the relative angular position of the device attached to the upper end of upper section 25C.

After the functions of locating the proper height and angular rotation of upper section 25C with respect to lower section 25D are accomplished, screws 61 on collar 58 are tightened to fix the height and angular rotation of upper section 25C with respect to lower section 25D. The process of locating and securing collar 58 is necessary only the first time the stand assembly 25 is assembled and locked into position.

To store the stand assembly 25, collar 45 is loosened and upper section 25C is pulled slightly out of lower section 25D (the direction of motion is parallel to the long axis of stand assembly 25) to move the tabs 68 out of the locked position 69 of bayonet slots 59, then upper section 25C is rotated (the rotation involves angular rotation about the long axis of stand assembly 25) and then upper section 25C is pushed into lower section 25D (the direction of motion is parallel to the long axis of stand assembly 25) so that tabs 68 are allowed to move out of the bayonet slots 59. The stand assembly may now be pushed to its minimum height and stored with upper section 25C almost entirely inside lower section 25D (i.e., if spacer 62 is flush with the bottom edge of upper section 25C, the bottom edge of upper section 25C will be flush with the upper edge of adapter 54).

The internal nature of the electrical conductor 57 and associated electrical jacks assures a permanent electrical connection between the top and the bottom of the stand assembly 25.

If mechanical memory of the relative position of upper section 25C with respect to lower section 25D is not required, the collar 58 may be locked at its lowest position so that upper section 25C can be almost fully extended if desired from lower section 25D. With sleeve 45A and collar 58 in place, upper section 25C will not pull completely out of lower section 25D. Thus, with sleeve 45A and collar 58 in place, the continuity of the internal electrical wiring will be maintained because upper section 25C can not be pulled entirely out of lower section 25D.

FIG. 5 shows the rotation adapter 70. The rotation adapter 70 is a single plain rotatable joint which joint is uniquely constructed to mount microphone type electrical jacks (and other electrical jacks) and suitable wiring so that when one end of the rotation adapter 70 is attached to the upper end of upper section 25C of stand assembly 25 a device, such as, for example, a lamp 7 of FIG. 2 can, while maintaining electrical continuity between the top of the stand assembly 25 and the device, be attached to the other end of rotation adapter 70 and said device can be rotated to any angle with respect to the plane containing the long axis of the stand assembly.

A screw or locating pin 71 (which serves as a memory and angular position lock) and screw locks 72 are means of securing and locking the rotation adapter 70 to the upper section 25C of stand assembly 25. Screw or locating pin 71 engages memory lock groove 64 of upper section 25C to fix the angular position of rotation adapter 70 around the long axis of stand assembly 25. Screw lock 72 serves to prevent motion parallel to the long axis of stand assembly 25 of the arm of rotation adapter 70 attached to the upper section 25C.

When screw 73 is not fully screwed into position, the angle of the long axes of the two arms 72A of rotation adapter 70 may be adjusted. Once the proper angle of the two arms 72A of rotation adapter 70 is established, screw 73 is fully screwed into position to lock the angle of the long axes of the two arms of rotation adapter 70. Once screw 73 is fully screwed into position, the rotation adapter memory of the angle between the two arms of rotation adapter 70 has been established for subsequent set-ups of equipment and devices using the rotation adapter.

The two halves of rotation adapter 70 may be identical. The long axes of the two arms of rotation adapter 70 may be co-planar or may not be co-planar (that is, if the long axes of the two arms of rotation adapter 70 are not co-planar, the arms are offset with respect to each other).

FIG. 6 shows a plug adapter 74 (which may be in the shape of a right circular cylinder) which can be used to locate a memory lock groove where a device is intended to attach (indirectly through the use of the plug adapter) to the end of rotation adapter 70 not attached to the upper end of upper section 25C of stand assembly 25. Plug adapter 74 has means for rotating section 74A with respect to section 74B and locking screws 75 to maintain the relative angular position of section 74A with respect to section 74B.

Memory lock groove 81 in section 74A and memory lock groove 80 in section 74B are used to fix the relative angular rotation of the rotation adapter with respect to a device attached to one end of the plug adapter and a rotation adapter attached to the other end of the plug adapter. For example, memory lock groove 81 engages screw or locating pin 71 of rotation adapter 70 of FIG. 5 and memory lock groove 80 engages screw or locating pin 77 of device adapter 76 of FIG. 7.

Female electrical jacks and electrical wiring are internal to the plug adapter.

Figure 7:
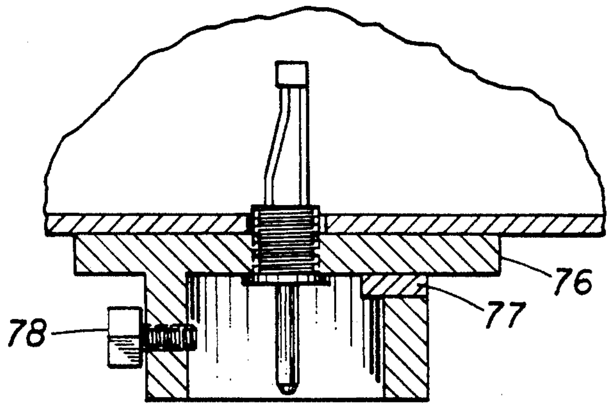
FIG. 7 shows a cross-sectional view of a device adapter (also called a device socket).

FIG. 7 shows a device adapter 76. The device adapter shown is designed for generally vertically mounted devices. The device adapter 76 is permanently attached to the bottom of a device such as the console 4 of FIG. 2. The device adapter has a standard male electrical jack to make electrical connection with, for example, the female electrical jack 51A (FIG. 4) in the upper section 25C (FIG. 4) of stand assembly 25 (FIG. 4) or to make contact with either end of plug adapter 74 (FIG. 6). Further, the device adapter 76 has a screw or locating pin 77 to engage a memory lock groove such as the memory lock groove 64 of the upper section 25C (FIG. 4) of stand assembly 25 (FIG. 4) or such as the memory lock grooves 81 or 80 (FIG. 6) of plug adapter 74 (FIG. 6). The locking screw 78 secures the device adapter 76 to either the upper section 25C (FIG. 4) of stand assembly 25 (FIG. 4) or to the plug adapter 74 (FIG. 6).

The exact form and shape of the device adapter 76 will depend upon the shape of the surface of the device to which surface the device adapter is attached.

Figure 8:
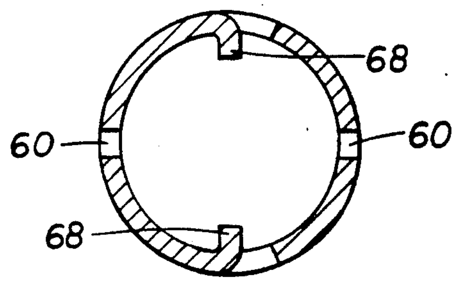
FIG. 8 shows a cross-sectional view along the line 8—8 in FIG. 4 of the stand assembly of FIG. 4 (the section is perpendicular to the long axis of the stand assembly).

FIG. 8 shows a cross-sectional view along the line 8—8 in FIG. 4 of the stand assembly 25 of FIG. 4 (the section is perpendicular to the long axis of the stand assembly). Tabs 68 fit into bayonet slots 59 (of FIG. 4). The set screws 61 (FIG. 4) of collar 58 (FIG. 4) will be visible through holes 60 shown in FIG. 8.

Typically, the sockets (base and device), stand assembly, the various adapters, and the components of each of the foregoing would be constructed mainly from metal. However, the sockets (base and device), stand assembly, and the various adapters could be constructed from any material (by way of example but not by way of limitation, the basic material could be machinable plastic or moldable plastic) which could be formed in the proper shape and which would not deform with use in a manner which would render the various parts unusable for the purposes of this invention.

The foregoing sets forth only one embodiment of mechanical memory and integral internal electrical connections. Obviously, other embodiments can be designed within the scope of this invention.

It is to be understood that while the various aspects of the invention have been described above with respect to their preferred embodiments other embodiments within the scope and spirit of this invention are possible.

For example, while not shown in the drawings which are attached to and which form a part of this application, it is possible with modifications within the scope of this invention to have more than two sections in a stand assembly 25. That is, it is possible to have a lower section which is inserted into a base, one or intermediate sections the bottom part of the lowest intermediate section being inserted into the top of the lower section whose bottom part is inserted into a base, and the upper part of the highest intermediate section is inserted into the bottom part of the upper section whose top part is inserted into, for example, a device socket or a rotation adapter.

By way of further example of modifications within the scope of this invention, in a number of places described above where there are mating electrical jacks, the location of the female electrical jacks and male electrical jacks could be reversed. By way of further example of modifications within the scope of this invention, the female and male electrical jacks could be replaced by other electrical connectors so long as the internal electrical continuity through the stand assembly and the joints is maintained.

By way of further example of modifications within the scope of this invention, the various adapters may be linked together in series. That is, in addition to the uses discussed above, one end of a rotation adapter may be attached to the top of a stand assembly, the other end of the rotation adapter may be attached to a plug adapter which may be attached to yet another rotation adapter and the free end of the final rotation adapter may be attached to a plug adapter which is then attached to a device adapter) or the free end of the final rotation adapter may be attached directly to a device adapter.

By way of further example of modifications within the scope of this invention, if the rotation adapters and/or plug adapters are made with dimensions which would allow one rotation adapter to mate with another rotation adapter or one plug adapter to mate with another plug adapter, two or more rotation adapters could be linked in series and/or two or more plug adapters could be linked in series.

By way of further example of modifications within the scope of this invention, the electrical conductor need not be in the form of a wire but may be in the form of a fiber optic cable or any other electrical conductor which can accommodate the full length of the stand assembly and coil when the stand assembly is collapsed by telescoping together the sections of the stand assembly.

By way of further example of modifications within the scope of this invention, if the electrical conductor were in the form of a thin insulated (or in certain circumstances, as discussed below, an uninsulated) conductive strip along the inner or outer wall or actually in the middle of the outer wall of the stand assembly and the various adapters and the stand assembly had suitable connections either to the coaxial plugs or instead of the coaxial plugs, the electrical conductor would not have to coil.

By way of further example of modifications within the scope of this invention, if the basic structural material of the stand assembly and the various adapters were electrically essentially non-conductive (by way of example but not by way of limitation, hard machinable plastic or moldable plastic), with suitable electrical connections the thin insulated or uninsulated conductors could be placed or deposited in a thin flat strip:

1. on the inner wall of the stand assembly and the various adapters;

2. actually inside the walls of the stand assembly and the various adapters;

3. on the outer wall of the stand assembly and the various adapters (under these circumstances and depending on the voltage in the conductors and the need to eliminate electrical interference with, or caused by, the electrical signal being transmitted by the conductors it might be desirable to provide insulation to prevent, for example, accidental contact with the conductor or electromagnetic interference with, or caused by, the electrical signal being transmitted by the conductors. IF THE VOLTAGE, AMPERAGE, FREQUENCY, NATURE, OR CHARACTER OF THE ELECTRICAL SIGNAL WERE SUCH THAT IT POSED A DANGER TO LIFE, IT IS STRONGLY RECOMMENDED THAT THE CONDUCTOR BE INSULATED TO PREVENT SUCH DANGER AND/OR DANGEROUS OR FATAL ELECTRICAL SHOCK TO HUMAN BEINGS.

The description and examples are intended to illustrate and not limit the scope of the invention which is defined by the full scope of the appended claims and which invention is entitled to protection within the full scope of the appended claims.

What is claimed is:

1. An electro-mechanical device mounting system with mechanical memory and integrated internal wiring comprising:

a base whose top surface lies generally in a plane with at least one base socket mounted in the base with the base socket having a top which lies generally in the plane of the base and with the base socket having a central opening which has a long axis and which central opening in the base socket is adapted to receive a telescoping stand assembly which closely fits into the central opening of the base socket, a telescoping stand assembly with a lower end and an upper end which telescoping stand assembly is elongated and has a long axis and with an internal electrically conductive path running the length of the telescoping stand assembly and which telescoping stand assembly has at least an upper section with an upper end and a lower end and a lower section with an upper end and a lower end and with a circular collar with two bayonet slots on opposite sides of the collar which collar is mounted on and outside the upper section and inside the lower section of the telescoping stand assembly and which telescoping stand assembly is closely fitted into the central opening of the base socket and with the upper end of the upper section of the telescoping stand assembly being adapted to fit closely into an end of a rotation adapter or into a device adapter, a means for establishing a desired value of and replicating an angle formed by the long axis of a given telescoping stand assembly after the given telescoping stand assembly is inserted into a base socket and the plane of the base, a means for establishing a desired value of and replicating angular rotation of a given telescoping stand assembly with respect to the long axis of the telescoping stand assembly after the given telescoping stand assembly is inserted into the central opening of a base socket, a means for controlling, establishing, and replicating the distance between the center of the lower end of a given telescoping stand assembly inserted into the central opening of a base socket and the plane of the base, a rotation adapter with two arms each of which has one open end and one end connected to a single rotatable joint and which rotation adapter has an internal electrically conductive path running from the open end of one arm to the open end of the other arm and with each open end adapted to receive a closely fitting end of the telescoping stand assembly or a closely fitting end of a plug adapter or to fit closely into a device adapter, a plug adapter which is elongated and which has two ends and which plug adapter has an internal electrically conductive path running from one end of the plug adapter to the other end of the plug adapter and which plug adapter is adapted to fit closely into a device adapter or an end of a rotation adapter and a device adapter with two sides one side of which device adapter is attached mechanically and electrically to an electro-mechanical device and the other side of which device adapter is in the form of an opening adapted to receive an end of a rotation adapter, an end of a plug adapter, or the upper end of the upper section of the telescoping stand assembly and which device adapter has an internal electrically conductive path running from one side of the device adapter to the other side of the device adapter.

2. An electro-mechanical device mounting system with mechanical memory and integrated internal wiring as in claim 1 in which all parts with the exception of the electrically conductive paths are made from an electrical non-conductor.

3. An electro-mechanical device mounting system as in claim 1 in which a plurality of base sockets are mounted in the base and in which one telescoping stand assembly is inserted into each base socket and in which one electro-mechanical device is attached to the upper end of the upper section of each telescoping stand assembly.

4. An electro-mechanical device mounting system as in claim 1 in which the telescoping stand assembly is comprised of more than two sections.

5. A method for mounting at least one electro-mechanical device on at least one elongated telescoping stand assembly with an upper section and a lower section which assembly is inserted into a base socket mounted in a base and for precisely restoring the relative spatial relationship of the mounted device and the base after disassembly and re-assembly of the device and the stand assembly comprising the steps of:

inserting the lower end of the lower section of the telescoping stand assembly into the base socket, establishing in a replicable manner the position of the base socket relative to the base, establishing in a replicable manner the distance between the center of the lower end of the telescoping stand assembly and the plane of the base, establishing in a replicable manner the angular rotation of the telescoping stand assembly with respect to the long axis of the telescoping stand assembly, attaching an electro-mechanical device to the upper end of the upper section of the telescoping stand assembly, establishing in a replicable manner the distance between the lower end of the upper section of the telescoping stand assembly and the lower end of the lower section of the telescoping stand assembly, and establishing in a replicable manner the angular rotation of the upper section of the telescoping stand assembly with respect to the lower section of the telescoping stand assembly.

* * * * *